United States Patent [19]
Menke

[11] Patent Number: 4,958,077
[45] Date of Patent: Sep. 18, 1990

[54] METHOD AND APPARATUS FOR DISPLAYING MOVING OBJECTS

[76] Inventor: Josef F. Menke, Foerdestrasse 27, D-2392 Gluecksburg, Fed. Rep. of Germany

[21] Appl. No.: 238,734
[22] Filed: Aug. 31, 1988

[30] Foreign Application Priority Data

Aug. 31, 1987 [DE] Fed. Rep. of Germany ....... 3729059

[51] Int. Cl.$^5$ .............................................. G01J 5/14
[52] U.S. Cl. ..................................... 250/347; 250/334; 250/342; 358/109; 358/113
[58] Field of Search ............... 250/342, 330, 332, 334, 250/353, 347, 236; 358/105, 113, 206, 109

[56] References Cited

U.S. PATENT DOCUMENTS

| | | | |
|---|---|---|---|
| 3,475,608 | 10/1969 | Pardes | 250/334 |
| 3,617,016 | 11/1971 | Bolsey | 358/105 |
| 3,781,468 | 12/1973 | Chomet et al. | 358/105 |
| 4,096,525 | 6/1978 | Lathan | 358/105 |
| 4,612,441 | 9/1986 | Pardes et al. | 250/342 |
| 4,639,774 | 1/1987 | Fried | 358/105 |
| 4,779,095 | 10/1988 | Guerreri | 358/105 |

Primary Examiner—Carolyn E. Fields
Attorney, Agent, or Firm—Wells & White

[57] ABSTRACT

The present invention is concerned with displaying moving objects (targets) wherein two time-shifted object signatures are imaged on a detector. Target scanning is with a prismatic rotating wheel, the periphery of which has a plurality of adjacent, recessed, and oppositely refelcting triplet mirror surfaces which alternately reflect the two signatures onto the detector. The position coordinates of the objects are defined by taking the difference of the detector output signals of the two object signatures. The display is characterized in that the first signature scan is delayed by an intermediate storage so that it shall be simultaneously available with the second signature scan. After taking the difference of the signals of these signature scans, the uncanceled individual signals remaining in the storage are defined as the coordinates of the moving objects and appear as electronic outputs.

4 Claims, 3 Drawing Sheets

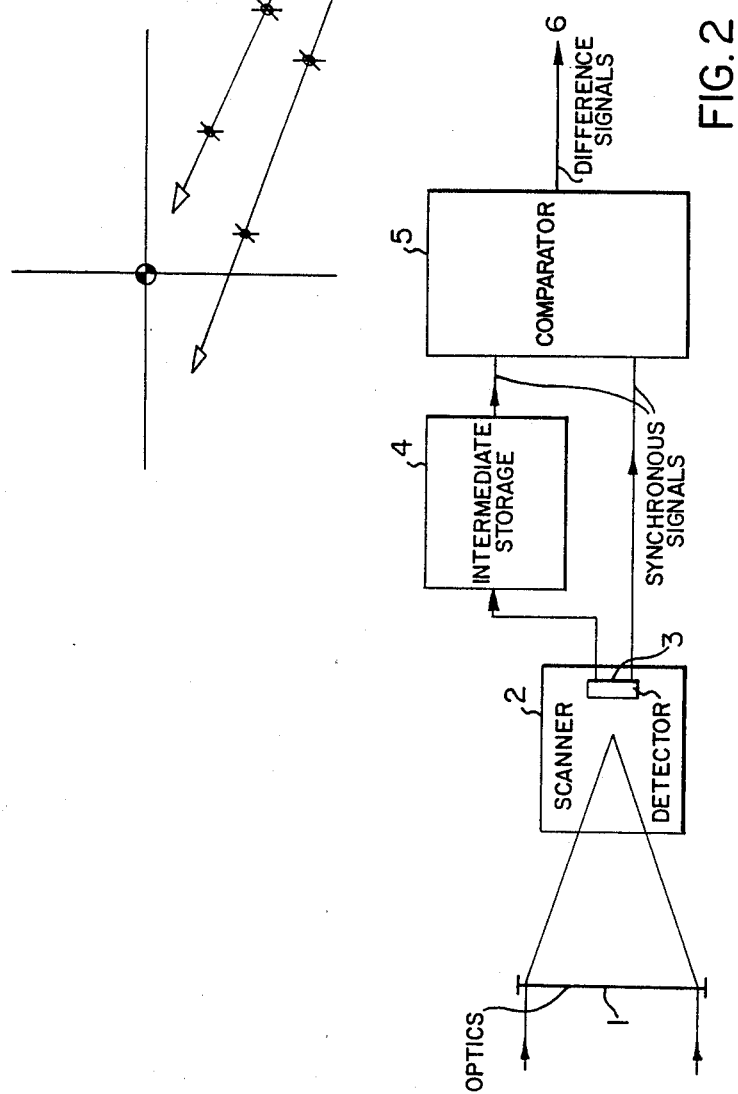

METHOD AND APPARATUS FOR DISPLAYING MOVING OBJECTS

BACKGROUND OF THE INVENTION

The field of the invention is light beam deflection by using a periodically moving element and the present invention is concerned with a method and apparatus for displaying moving objects (targets) whereby two time-shifted object signatures are imaged in dot-grid manner on a detector.

In displays of this kind, the objects are imaged in the optical or infrared wavelength range on the detector and the attempt is made to detect also small angular objects far away.

The state of the art of these displays may be ascertained by reference to U.S. Pat. Nos. 4,266,847; 4,574,197; 4,588,254 and 4,733,072, the disclosures of which are incorporated herein by reference.

In the present state of the art these displays are implemented by carrying out parallel horizontal scanning in all directions or over a large sector in one or more superposed strips of a many element array. By comparing two time-sequential scans, the moving object may be recognized. In such methodology, however, this comparison requires an enormous memory. Moreover the repeat rate in such procedures is in the seconds range. During that time period of seconds the object (target), when moving at so low an angular speed as to be still significant, may have moved by so many image dots, that it will be difficult to unambiguously allocate the information of the two images.

Angular speed herein means the speed of lateral deviation of the moving object (target), for instance an incoming rocket, from the line of sight between observer and rocket. As a result, an object moving at high angular speed is of no interest because the object is passing by the observer, whereas the object will be more likely to strike the observer the less that angular speed. When this angular speed is null, the object is moving on a straight line directly toward the observer.

SUMMARY OF THE INVENTION

The object of the present invention is to produce a method and apparatus which in the first place requires much less memory and which in the second place allows a substantially higher scan rate, whereby objects with only low angular speed can also unambiguously be detected.

This object is achieved according to the present invention wherein the method and apparatus for displaying moving objects (targets) having two object signatures in the optical and/or infrared wavelength range and with a minimum mutual time shift are imaged in dot-grid form on a detector having output signals defining the position coordinates upon taking the difference of these two object signatures, are improved upon by:

(a) time delaying the first signature scan by an intermediate storage that is simultaneously available with the second signature scan;

(b) taking the difference of the two signature-scans; and (c) using the remaining uncanceled individual signals in the storage to define the coordinates of the moving objects where these coordinates are present in electronic form at the output.

In the method and apparatus of the present invention for determining object motion, only the coordinates of objects not yet suppressed need be stored, and therefore the memory capacity requirements therein are much less than in the state of the art (omni-directional scanning), for instance by a factor of 60. Simultaneously however, the scan repeat rate is raised from the seconds range into a range of a scan rate (frequency) of about 50 ms.

BRIEF DESCRIPTION OF THE DRAWINGS

The appended drawings illustrate the method and apparatus for carrying out the present invention, wherein:

FIG. 1 is a schematic presentation of the problem;

FIG. 2 is a block diagram showing the apparatus for carrying out the invention;

DESCRIPTION OF THE PREFERRED EMBODIMENTS

FIG. 1 states the problem and this figure shows target analysis using two air targets.

Approach A is a direct approach. When analyzing the image coordinates of two shifted object signatures, the computer determines that while the coordinates are the same, the signal amplitudes of the flying body have changed, i.e., they became larger because of the reduced distance.

Approach B is a pass. A shift results in the position of the target information of the second scan relative to the first scan. By taking the difference of the two data a residual signal is obtained which is processed further as a target signal by a guidance firing system.

Figure 3:
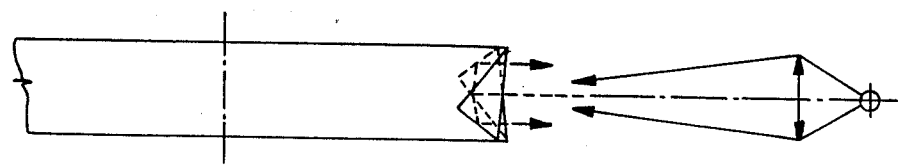
FIG. 3 is a schematic representation of the common imaging system of a rotating triplet reflecting wheel useful in the line scan of scanner 2 of FIG. 2.
Figure 4:
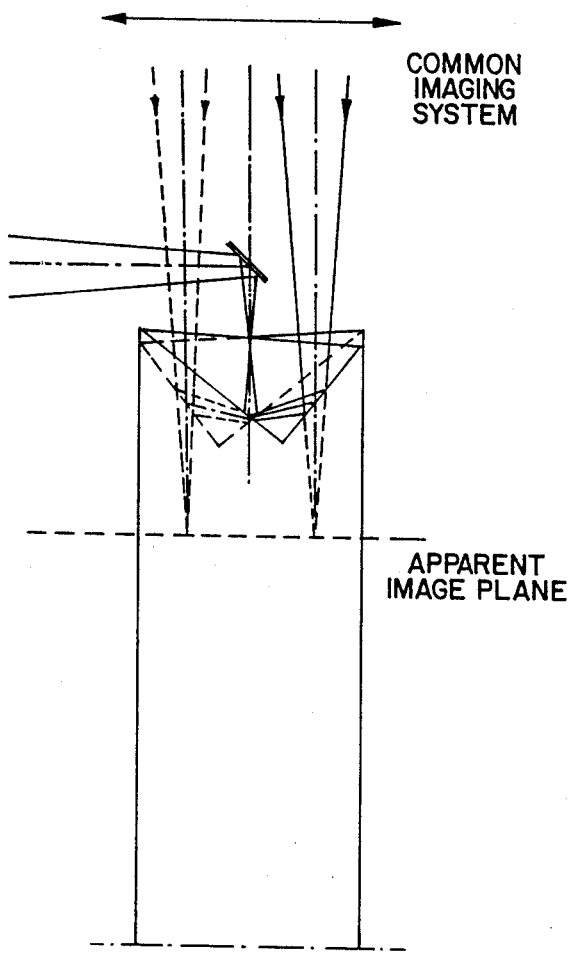
FIG. 4 is a schematic representation showing how the triplet reflecting wheel (mirrors) of FIG. 3 reflects 100% of an incident beam alternately to one side and then to the other.
Figure 5:
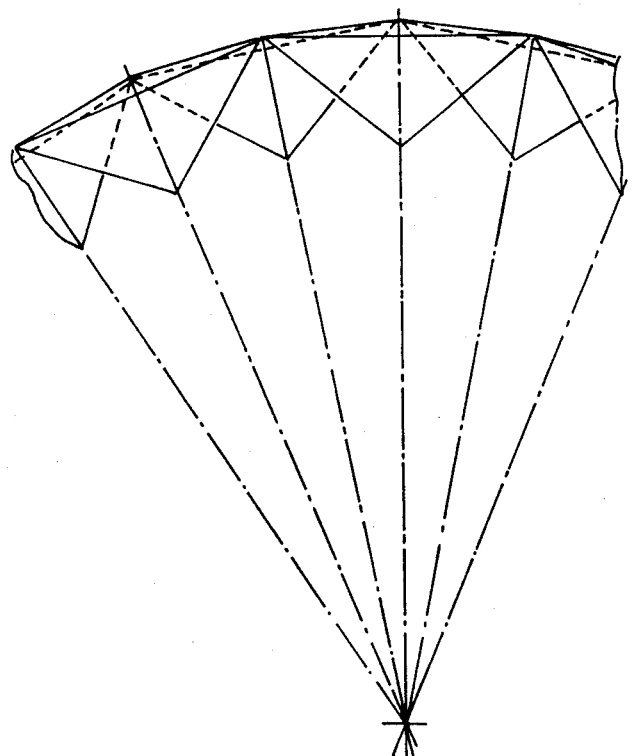
FIG. 5 is a schematic representation of the triplet mirror.
Figure 6:
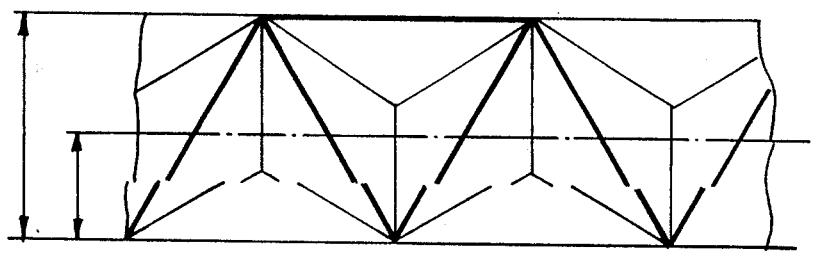
FIG. 6 is a detailed showing of the mirror of FIG. 5.

FIG. 2 is a block diagram of the apparatus with which the invention is carried out. The lens (optics) 1 transmits optical or infrared rays from a target to a scanner 2 scanning the object field in a grid of lines and columns. Illustratively the scanner described in the U.S. Pat. 4,266,847 is useful. However a rotating triplet reflecting wheel of the type shown in FIGS. 3-6 is used for the line scan. This is a prismatic wheel of which the periphery bears adjacent, recessed and mutually opposite triplet mirrors. These triplet mirrors reflect 100% of an incident beam alternately to one side and then to the other (FIG. 4) when rotating the two reflected beams being relative shifted to each other, namely by that time which is needed by one triplet mirror to rotate from its first half to its second half past the beam.

Accordingly the triplet mirror provides two beams of the same image point which are slightly shifted from one another and which are fed through other optical components to a many-element detector 3. Illustratively such a detector can be a Sprite detector with eight elements, which is made by Mullard in Great Britain.

The outputs of the detector 3 therefore are the signals of two time-shifted object signatures. The signals of the first object signature are fed to a computer-controlled electronic intermediate storage 4 and are stored there until the signals of the time shifted second signature are available.

The moment this is the case, the signals of the two object signatures are simultaneously fed to a computer-controlled, electronic comparator 5 where their difference is computed.

The remaining non-overlapping signals are due to the target in sight which in the time interval between the first and second object-field scans (time-shift between the two passes of the triple mirror halves at one beam) did move by some distance.

These remaining signals 6 due to the target are fed by the computer to a firing guidance system which determines the target coordinates and issues corresponding firing commands.

The electronic intermediate storage 4 and the comparator 5 consist of conventional components, computers etc. available to one skilled in the art.

I claim:

1. A method for displaying moving objects comprising:
   (a) conducting a line scan of an object with a prismatic rotating wheel, the prismatic rotating wheel periphery including a plurality of adjacent, recessed, and oppositely reflecting triplet mirror surfaces;
   (b) said prismatic rotating wheel oppositely reflecting triplet mirror surfaces alternately deflecting a first signature scan and a second signature scan of said object with a minimum mutual time shift in first and second directions respectively, onto a single detector;
   (c) time delaying said first signature scan by an intermediate storage so that it is simultaneously available with said second signature scan;
   (d) determining the difference of said signature scans; and,
   (e) defining the remaining uncancelled individual signals in said storage as coordinates of said object and presenting these coordinates in electronic form as output signals for defining position coodinates of said object.

2. The method of claim 1, wherein said minimum mutual time shift is about 50 ms.

3. An apparatus for displaying moving objects, comprising:
   (a) means for scanning and imaging having a prismatic rotating wheel deflecting a first signature scan and a second signature scan of an object with a minimum mutual time shift, the prismatic rotating wheel periphery having a plurality of adjacent, recessed, and oppositely reflecting triplet mirror surfaces which alternate reflect said first and second signature scans in first and second directions respectively;
   (b) a single detector receiving said first and second signature scans having a minimum mutual time shift;
   (c) means for time delaying said first signature scan by an intermediate storage so that it is simultaneously available with said second signature scan;
   (d) means for determining the difference of said signature scans; and
   (e) means for defining the remaining uncanceled individual signals in said storage as coordinates of said object and means for presenting these coordinates in electronic form as output signals for defining position coordinates of said object.

4. The apparatus of claim 3, wherein said minimum mutual time shift is about 50 ms.

* * * * *